H. STEINHART.
ELECTRIC STARTING MOTOR.
APPLICATION FILED DEC. 31, 1919.
1,438,728.
Patented Dec. 12, 1922.
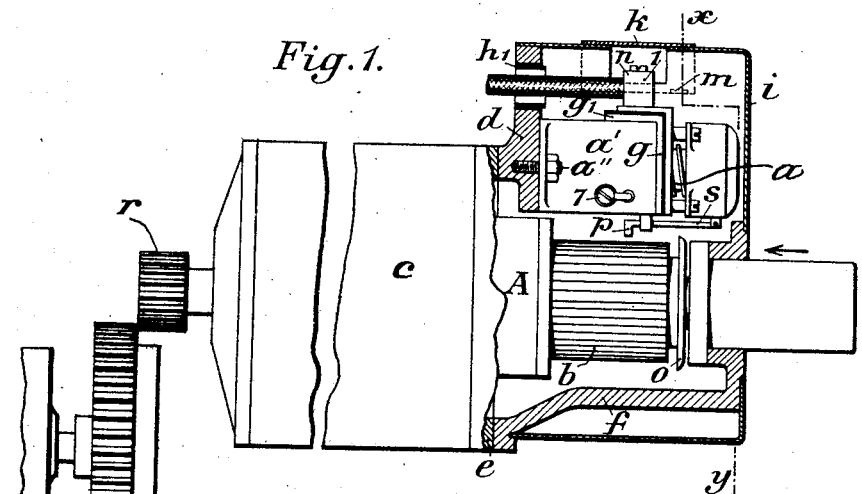
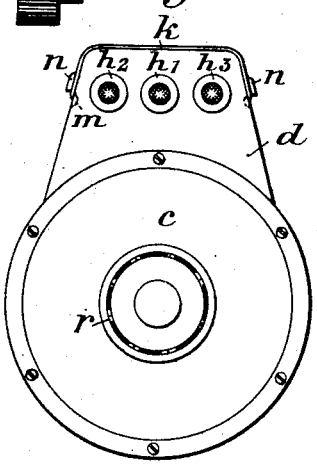
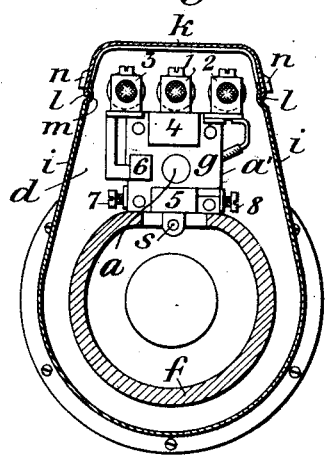
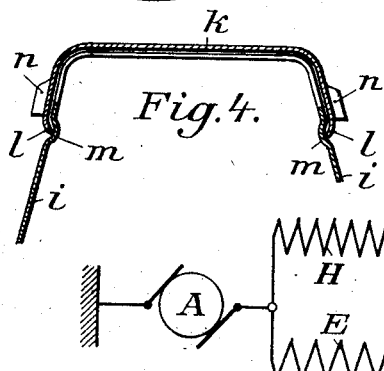
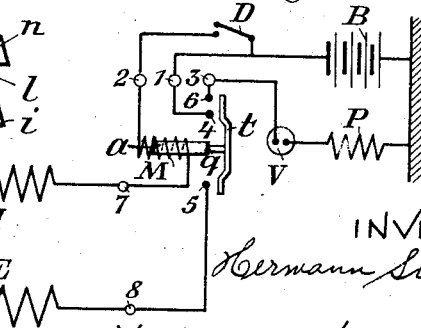
INVENTOR
Hermann Steinhart
BY ATTORNEYS
Pennie, Davis, Marvin & Edmonds.

Patented Dec. 12, 1922.

1,438,728

UNITED STATES PATENT OFFICE.

HERMANN STEINHART, OF STUTTGART, GERMANY, ASSIGNOR TO THE FIRM OF ROBERT BOSCH AKTIENGESELLSCHAFT, OF STUTTGART, GERMANY.

ELECTRIC STARTING MOTOR.

Application filed December 31, 1919. Serial No. 348,704.

*To all whom it may concern:*

Be it known that I, HERMANN STEINHART, a citizen of Germany, residing at and whose post-office address is Stuttgart, Germany, Jägerstr. 40, have invented certain new and useful Improvements in Electric Starting Motors, of which the following is a specification.

This invention relates to an electric motor for starting internal combustion engines which is furnished with two successively closed circuits, that are so arranged that when the initial starting circuit is closed, a weak current, which causes the armature to rotate slowly is supplied to it, whilst the full working current flows through the motor when the second or final circuit is established. The changing over from the first to the second circuit is performed by means of an automatic switch.

The invention consists in a design which enables the change-over switch to be directly mounted upon the starting motor. An advantage of this arrangement over the known method of mounting the switch separate from the motor consists in the parts of the starting device being reduced in number and thus rendered easier to inspect, and in the wiring and installation of the equipment upon the motor-car, aeroplane or the like, being greatly simplified. The switch is preferably fixed to a support which is combined with the armature bearing on the commutator side of the motor. This support may, for example, be made in the shape of a flange. To make the switch readily accessible it is preferably arranged above the commutator, where it takes up very little space and causes no addition to the length of the machine.

The connecting devices such as cable terminals, contact plates etc., for the switch as well as the starting motor, are all mounted on the housing of the switch, the end plate of the casing forming a support for several terminals of this kind.

The commutator, and the automatic switch mounted above it, is enclosed in a protecting cover which is preferably provided with an opening through which convenient access may be had to the terminals, and which may be closed by a lid. This lid is preferably made of sheet metal and shaped so as to act like a spring. It is also preferably provided with projections that click into small hollows in the protecting cover when the lid is pressed down onto its seat.

Tubes or sleeves, which surround the leads to the motor, are inserted in the above-mentioned flange, that is integral with the body of the bearing adjacent to the commutator, and in order to facilitate the threading-in and fixing of these leads in the motor terminals, the said tubes are arranged so that their longitudinal axes, and the longitudinal axes of the holes in the said terminals, lie in the same straight lines.

The machine shewn in the drawing, which represents a manner of carrying out the invention, is a starting electric motor with a cylindrical casing, a coupling member (pinion) arranged to be shifted longitudinally, and an electromagnetically operated switch whose armature is first caused by a mechanical power to approach its magnet pole and is then attracted magnetically only after a certain approximation between it and the pole has been reached, when the second or final motor circuit will be established.

Fig. 1 shews a front elevation of the motor, partly in longitudinal section,

Fig. 2 is end view as seen from pinion end of the machine,

Fig. 3 is a section on the line $x$—$y$ of Fig. 1,

Fig. 4 is section of the protecting cover and its lid on an enlarged scale and

Fig. 5 is a diagram of the circuits of the starting motor.

As shewn in Figs. 1 and 3 the automatic switch $a$ is arranged above the commutator $b$ of the starting motor $c$. The housing $a'$ of the switch $a$ is fastened by screws $a''$ to a flange $d$, which is integral with the body $f$ of the bearing that is attached to the commutator end $e$ of the motor casing. When thus mounted the switch $a$ and its housing $a'$ take up very little space and do not add to the length of the machine. An extension $g'$ of the end plate $g$ running at right angles to the plate, bears upon the top surface of the housing $a'$ of the switch. Mounted upon the extension $g'$ are several conductor-connecting-devices (terminals) 1, 2, 3 and some contact plates 4, 5, 6 are arranged upon the front of the plate $g$. The functions of these terminals and contact plates will be described later in connection with the circuits shewn in Fig. 5.

Inserted in the flange $d$ of the commutator bearing are leading-in tubes $h^1$, $h^2$, $h^3$ of insulating substance. The axis of the tube $h^1$ and that of the hole in terminal 1 lie in a straight line, and the tubes $h^2$, $h^3$ and the holes in the terminals 2, 3 have also common longitudinal axes, this arrangement enabling the wires or leads inserted through the leading-in tubes $h^1$, $h^2$, $h^3$ to be easily threaded into and fixed in the terminals 1, 2, 3. To limit as far as possible the restraint as to the direction in which the wires may be led up to, and into, the motor, leading-in tubes similar to $h$ may also be provided in the end wall of the protecting cover $i$ that is opposite to the flange $d$.

For the handling of the terminals 1, 2, 3 and others which are attached to the switch housing $a'$, it is not necessary to remove the protecting cover $i$ that incloses the commutator $b$ and the switch $a$, because an opening in the cover $i$ is provided above the switch which is closed by an easily removed lid $k$. This lid consists of sheet metal which is shaped so as to act like a spring. It has bent ears $l$ or other suitable extensions which, on the lid being pressed down onto its seat, are caused by the spring action of the lid to click into corresponding cavities $m$ in the cover. For the convenient removal of the lid, pockets $n$ are provided at both sides for the insertion of the fingers.

The mode of operation of the switch $a$, and the significance of the various terminals and contact plates shewn in Figs. 1 and 3, will be evident from the circuits illustrated in Fig. 5.

In this A denotes the armature of the starting motor, E its main field winding, H an auxiliary field winding, $a$ the automatic switch, M its coil, B the battery, P the primary coil of the ignition apparatus for the internal combustion engine, V the ignition amplifier, and D a press button switch.

On the closure of the press button switch D a current flows from the battery through the press button switch, terminal 2 of the switch $a$, magnet coil M of this switch, terminal 7, and, at first, through the auxiliary winding H only to the motor armature A and thence through the body of the machine back to the battery. On account of the comparatively large resistance of the auxiliary field winding H the motor armature $a$ receives only a small current so that it only rotates slowly. But the auxiliary field winding also exercises an attractive magnetic force upon the armature A of the starting motor, which is normally kept displaced from the field between the pole faces by a spring, so that the pinion $r$ (Fig. 1) is held out of engagement with the circle of teeth on the flywheel of the internal combustion engine that is to be started by the motor. When the motor armature, whilst turning slowly, is drawn by the said attractive force into the field as indicated by the arrow in Fig. 1, the pinion $r$ enters into engagement with the teeth of the flywheel without jarring.

During the longitudinal movement of the armature a collar $o$ on its shaft strikes against a nose $p$ (Fig. 1) which is attached to a rod $s$ that is fixed to the armature $q$ (see Fig. 5) of the switch $a$. Hence, after the motor armature A has moved a certain distance in the direction of the arrow, the rod $s$ is made to participate in this movement, and the armature $q$ is thus brought near enough to the magnet pole of the switch $a$ to permit of the armature $q$ being magnetically attracted. These are the functions performed during the first stage of operation of the switch.

When the switch armature $q$ is fully attracted, it causes the closure of the second or final motor circuit by interconnecting the contact plates 4, 5, 6 with the aid of the brush $t$ mounted upon the end of the armature $q$. In addition to the circuit already described, a supplemental circuit is now closed in which current flows through the terminal 1 on the switch housing $a'$, contact plate 4 on the end plate $g$ of the switch housing, brush $t$, contact plate 5, terminal 8, and main field winding E to the motor armature A. The main and auxiliary field windings are now connected in parallel so that the effect of the auxiliary winding is added to that of main field winding E. The starting motor now receives its full or normal working current and by means of the pinion $r$ it exerts a powerful torque on the flywheel of the internal combustion engine.

Another branch circuit may be traced from the battery through the contact plate 6 and the terminal 3 to the amplifier V and the primary coil P of the ignition apparatus.

I claim:—

1. In combination with an internal combustion engine, an electric starting motor having an armature, an initial circuit and a final circuit for said motor, a switch for changing over from the said initial starting circuit to the final circuit, a housing for said switch, terminals for the switch and motor, a commutator, an armature bearing adjacent to the commutator, a support attached to said armature bearing, means for mounting said housing of said switch on the support at the upper side of the commutator, said housing carrying said terminals.

2. In combination with an internal combustion engine, an electric starting motor having an armature, an initial circuit and a final circuit for said motor, a switch for changing over from the said initial starting circuit to the final circuit, terminals for the switch and motor having holes therein for receiving conductors, a housing for said switch, a commutator, an armature bearing adjacent to the commutator, a support attached to said armature bearing, means for mounting said housing of said switch on the support at the upper side of the commutator, said housing carrying said terminals, and leading in tubes arranged in said support with their longitudinal axes coincident with the axes of the conductor receiving holes in said terminals.

3. In combination with an internal combustion engine, an electric starting motor having an armature, an initial circuit and a final circuit for said motor, a switch for changing over from the said initial starting circuit to the final circuit, a housing for said switch terminals for the switch and motor, a commutator, an armature bearing adjacent to the commutator, a support attached to said armature bearing, means for mounting said housing of said switch on the support at the upper side of the said commutator, said housing carrying said terminals, and a cover enclosing the said commutator and switch, said cover having an opening affording access to this switch, and a removable lid associated with said opening.

In testimony whereof I have affixed my signature in presence of two witnesses.

HERMANN STEINHART.

Witnesses:
 ADOLPH SEBERERS,
 J. MARKUS MEYER.